United States Patent
Leue et al.

(10) Patent No.: US 7,356,174 B2
(45) Date of Patent: Apr. 8, 2008

(54) CONTRABAND DETECTION SYSTEM AND METHOD USING VARIANCE DATA

(75) Inventors: William Macomber Leue, Albany, NY (US); Ricardo Scott Avila, Clifton Park, NY (US); Colin Craig Mc Culloch, Charlton, NY (US); Samit Kumar Basu, Niskayuna, NY (US); Deborah Joy Walter, Burnt Hills, NY (US)

(73) Assignee: General Electric Company, Niskayuna, NY (US)

( * ) Notice: Subject to any disclaimer, the term of this patent is extended or adjusted under 35 U.S.C. 154(b) by 734 days.

(21) Appl. No.: 10/839,858

(22) Filed: May 7, 2004

(65) Prior Publication Data

US 2005/0249416 A1    Nov. 10, 2005

(51) Int. Cl.
*G06K 9/00* (2006.01)
(52) U.S. Cl. ...................................... 382/131
(58) Field of Classification Search ................ 382/100, 382/131, 141; 378/4, 57; 345/424
See application file for complete search history.

(56) References Cited

U.S. PATENT DOCUMENTS

| | | | |
|---|---|---|---|
| 3,432,664 A | 3/1969 | Robison | |
| 3,518,433 A | 6/1970 | Owen | |
| 3,714,486 A | 1/1973 | McCrary | |
| 3,783,288 A | 1/1974 | Barbour et al. | |
| 4,200,800 A | 4/1980 | Swift | |
| 4,289,969 A | 9/1981 | Cooperstein et al. | |
| 5,115,394 A | 5/1992 | Walters | |
| 5,200,626 A | 4/1993 | Schultz et al. | |
| 5,247,561 A | 9/1993 | Kotowski | |
| 5,491,734 A | 2/1996 | Boyd et al. | |
| 5,712,926 A * | 1/1998 | Eberhard et al. | ........... 382/205 |
| 5,784,481 A | 7/1998 | Hu | |
| 6,026,171 A * | 2/2000 | Hiraoglu et al. | ............ 382/100 |
| 6,088,423 A * | 7/2000 | Krug et al. | ................... 378/57 |
| 6,115,448 A | 9/2000 | Hoffman | |
| 6,207,958 B1 | 3/2001 | Giakos | |
| 6,385,292 B1 | 5/2002 | Dunham et al. | |
| 6,418,189 B1 | 7/2002 | Schafer | |
| 6,574,299 B1 | 6/2003 | Katsevich | |
| 7,031,430 B2 * | 4/2006 | Kaucic et al. | ................ 378/57 |
| 2002/0085674 A1 | 7/2002 | Price et al. | |
| 2003/0072407 A1 | 4/2003 | Mihara et al. | |

FOREIGN PATENT DOCUMENTS

| | | |
|---|---|---|
| EP | 1230950 B1 | 9/2002 |
| EP | 1277439 | 1/2003 |
| GB | 1390575 | 4/1975 |
| WO | 99/67806 | 6/1998 |

OTHER PUBLICATIONS

"Three-Dimensional Multi-Scale Line Filter for Segmentation and Visualization of Curvilinear Structures in Medical Images," Y. Sato et al., Medical Image Analysis (1998) vol. 2, No. 2, pp. 143-168.

* cited by examiner

*Primary Examiner*—Matthew C. Bella
*Assistant Examiner*—Tom Y Lu
(74) *Attorney, Agent, or Firm*—William E. Powell, III; Curtis B. Brueske (57) ABSTRACT

A technique is disclosed for detecting contraband by obtaining image data from a computed tomography machine and generating variance data and a variance map from the image data acquired. The method includes obtaining a mean density value and a variation value for each voxel of the image data, segmenting the voxels into discrete objects, and determining whether any of the discrete objects is contraband.

29 Claims, 6 Drawing Sheets

CONTRABAND DETECTION SYSTEM AND METHOD USING VARIANCE DATA

BACKGROUND

The present invention generally relates to the field of image reconstruction in computed tomography (CT) systems, and more particularly to a system and method for detecting contraband through the use of variance data.

CT systems operate by projecting fan-shaped, cone-shaped or helically shaped X-ray beams through an object. The X-ray beams are generated by an X-ray source, and are generally collimated prior to passing through the object being scanned. The attenuated beams are then detected by a set of detector elements. The detector elements produce a signal based on the intensity of the attenuated X-ray beams, and the signals are processed to produce projections. By using reconstruction techniques such as filtered backprojection, useful images are formed from these projections.

A computer is able to process and reconstruct images of the portions of the object responsible for the radiation attenuation. As will be appreciated by those skilled in the art, these images are computed by processing a series of angularly displaced and possibly translated projection images. This data is then reconstructed to produce the image, which is typically displayed on a cathode ray tube, and may be printed or reproduced on film.

Traditional CT reconstruction techniques comprise reconstructing the mean CT number at each voxel. However, there is variability in that value caused by noise factors such as photon noise (X-ray noise), quantization noise and electronic noise in the projection measurements interacting with the reconstruction process, and by other physical effects and sources of artifacts. It is therefore advantageous not only to reconstruct the mean CT number, but also the variance associated with each voxel for improved image analysis. In addition, a point wise variance estimate for each voxel also provides additional diagnostic information about the reconstructed image.

One way of generating a variance image is to take an ensemble of images, reconstruct each image, and then compute the variance in the reconstruction over the ensemble of datasets. However, a disadvantage with this technique is that repeated scanning is needed for reconstruction of multiple images, thereby making it computationally inefficient and impractical in application. A computationally efficient method for determining voxel variance data and generating variance images is therefore desired. It would also be useful to develop ways to use and apply such information, such as in analysis of reconstructed CT images, or for improved image acquisition or reconstruction.

In attempting to detect contraband in enclosed containers, such as, for example, luggage or parcels, one difficulty in reconstructing images of the contraband is being able to properly segment the reconstructed images, namely being able to distinguish the contraband from any other object located in the enclosed container. A computationally efficient method for segmenting one object image from another is therefore desired.

SUMMARY

An exemplary embodiment of the invention provides techniques for generating variance data and variance maps to respond to such needs. In accordance with the exemplary embodiment, a method for detecting contraband in an enclosed container is provided. The method includes the steps of forming image data of the contents of the enclosed container, obtaining a mean density value and a variation value for each voxel of the image data, segmenting the voxels into discrete objects, and determining whether any of the discrete objects is contraband.

In accordance with an aspect of the exemplary methodology, the method includes forming image data of the contents of the enclosed container by acquiring projection data of the contents of the enclosed container and processing the projection data to form the image data. Further, the segmenting step includes utilizing intensity values and the direction of the local normal vector for each voxel as criteria for segmenting voxels into the discrete objects.

In accordance with another exemplary embodiment, a system for detecting contraband is provided. The system includes an imaging system for acquiring image data and a processor. The processor is configured to obtain a mean density value and a variation value for each voxel of the image data and segment the voxels into discrete objects.

DETAILED DESCRIPTION OF THE PREFERRED EMBODIMENTS

Figure 1:
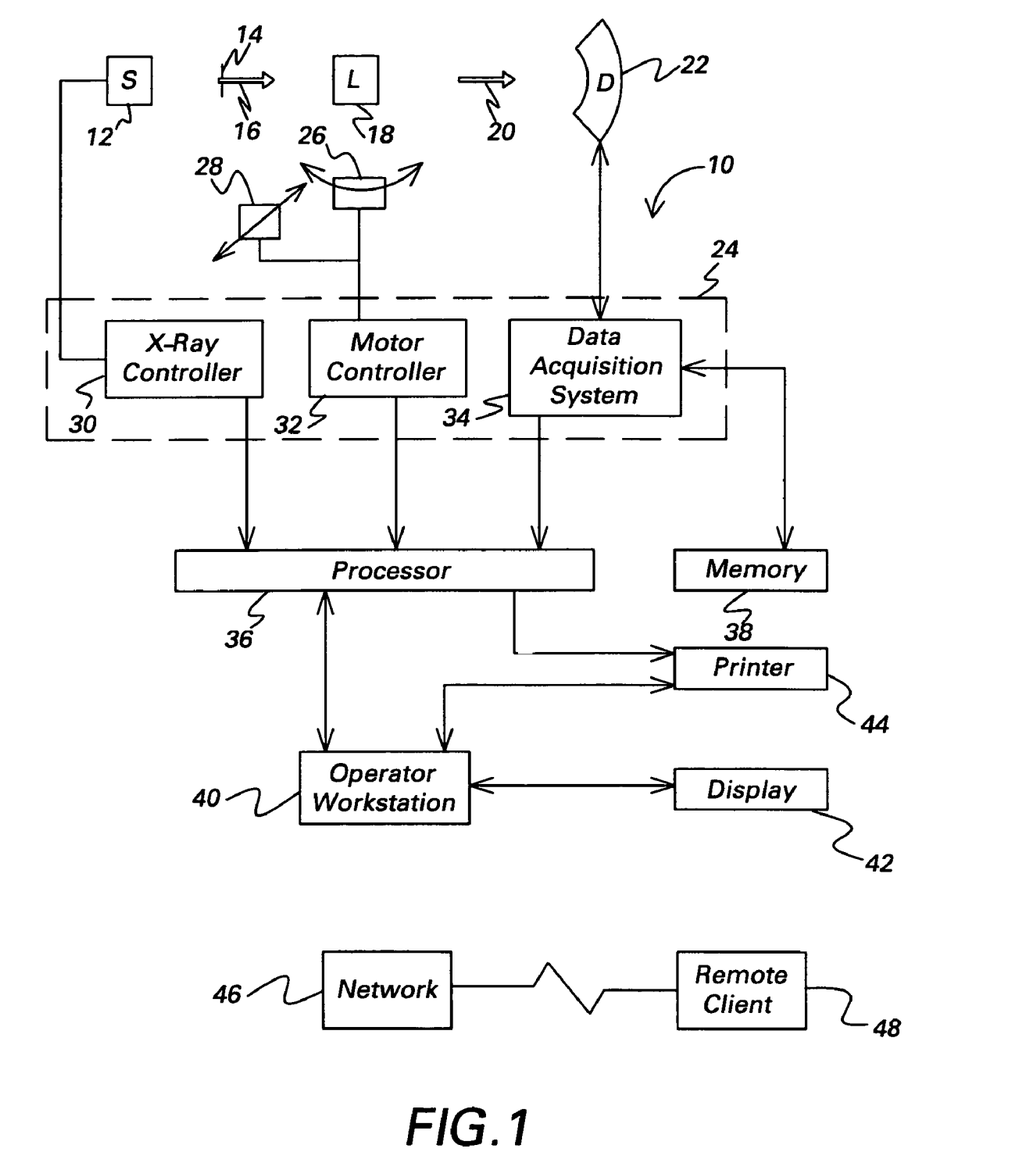
FIG. 1 is a diagrammatical view of an exemplary imaging system in the form of a CT imaging system for use in producing processed images and generating variance image data and maps in accordance with aspects of an exemplary embodiment.

FIG. 1 illustrates diagrammatically an imaging system 10 for acquiring and processing image data and variance data. In the illustrated embodiment, system 10 is a computed tomography (CT) system designed both to acquire original image data, and to process the image data for display and analysis in accordance with an exemplary embodiment. In addition, the system 10 is designed to formulate variance data or variance measures from original projection data, process the variance measures and generate a variance map for display and analysis in accordance with an exemplary embodiment. The illustrated imaging system 10 includes a source of X-ray radiation 12 positioned adjacent to a collimator 14. In this exemplary embodiment, the source of X-ray radiation source 12 is typically an X-ray tube.

The collimator 14 permits a stream of radiation 16 to pass into a region in which an object, for example, a subject of interest 18, such as a piece of luggage, is positioned. A portion of the radiation 20 passes through or around the subject and impacts a detector array, represented generally at reference numeral 22. Detector elements of the array produce electrical signals that represent the intensity of the incident X-ray beam. These signals are acquired and processed to reconstruct images of the features within the luggage 18.

The system controller 24 controls the source 12 and furnishes both power and control signals for CT examination sequences. Moreover, the detector array 22 is coupled to the system controller 24, which commands acquisition of the signals generated in the detector 22. The system controller 24 may also execute various signal processing and filtration functions, such as for initial adjustment of dynamic ranges, interleaving of digital image data, and so forth. In general, the system controller 24 commands operation of the imaging system 10 to execute examination protocols and to process acquired data. In the present context, system controller 24 also includes signal processing circuitry, typically based upon a general purpose or application-specific digital computer, associated memory circuitry for storing programs and routines executed by the computer, as well as configuration parameters and image data, interface circuits, and so forth.

As illustrated, the system controller 24 is coupled to a rotational subsystem 26 and a linear positioning subsystem 28. The rotational subsystem 26 enables the X-ray source 12, collimator 14 and the detector 22 to be rotated one or multiple turns around the subject 18. It should be noted that the rotational subsystem 26 might include a gantry. Thus, the system controller 24 may be utilized to operate the gantry. The linear positioning subsystem 28 enables the subject 18, or more specifically, a structure upon which the subject 18 is placed, such as, for example, a conveyor belt, to be displaced linearly. Thus, the conveyor belt may be linearly moved within the gantry to generate images of particular areas of the subject 18.

Additionally, as will be appreciated by those skilled in the art, the source of radiation may be controlled by an X-ray controller 30 disposed within the system controller 24. Particularly, the X-ray controller 30 is configured to provide power and timing signals to the X-ray source 12. A motor controller 32 may be utilized to control the movement of the rotational subsystem 26 and the linear positioning subsystem 28.

It should be further appreciated that, instead of utilizing rotatable components, the imaging system 10 may instead utilize a stationary source and/or detector. For example, and for illustrative purposes only, the imaging system 10 may include CT scanners such as "third generation" computed tomography (CT) scanners, $4^{th}$ generation CT scanners (commercially available from American Science and Engineering, Inc.), $5^{th}$ generation CT scanners (commercially available under the trademark IMATRON® by Imatron Inc.), or CT scanners with a stationary x-ray source and a stationary detector.

Further, the illustrated system controller 24 also includes a data acquisition system 34. In this exemplary embodiment, the detector 22 is coupled to the system controller 24, and more particularly to the data acquisition system 34. The data acquisition system 34 receives data collected by readout electronics of the detector 22. The data acquisition system 34 typically receives sampled analog signals from the detector 22 and converts the data to digital signals for subsequent processing by a processor 36.

The processor 36 is typically coupled-to the system controller 24. The data collected by the data acquisition system 34 may be transmitted to the processor 36 and to a memory 38. It should be understood that any type of memory for storing a large amount of data may be utilized by such an exemplary system 10. Moreover, the memory 38 may be located at this acquisition system or may include remote components for storing data, processing parameters, and routines described below. Also the processor 36 is configured to receive commands and scanning parameters from an operator via an operator workstation 40 typically equipped with a keyboard and other input devices. An operator may control the imaging system 10 via the input devices. Thus, the operator may observe the reconstructed images and other data relevant to the system from the processor 36, initiate imaging, and so forth.

A display 42 coupled to the operator workstation 40 may be utilized to observe the reconstructed image and the reconstructed variance map and to control imaging. Additionally, the images may also be printed by a printer 44 which may be coupled to the operator workstation 40. The display 42 and printer 44 may also be connected to the processor 36, either directly or via the operator workstation 40. Further, the operator workstation 40 may also be coupled to a network 46. It should be noted that the network 46 might be coupled to a remote client 48, such as an airport security remote terminal or to an internal or external network, so that others at different locations may gain access to the image and to the image data.

It should be further noted that the processor 36 and operator workstation 40 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution, or in an entirely different location, linked to the image acquisition system via one or more configurable networks, such as the Internet, virtual private networks, and so forth.

Figure 2A:
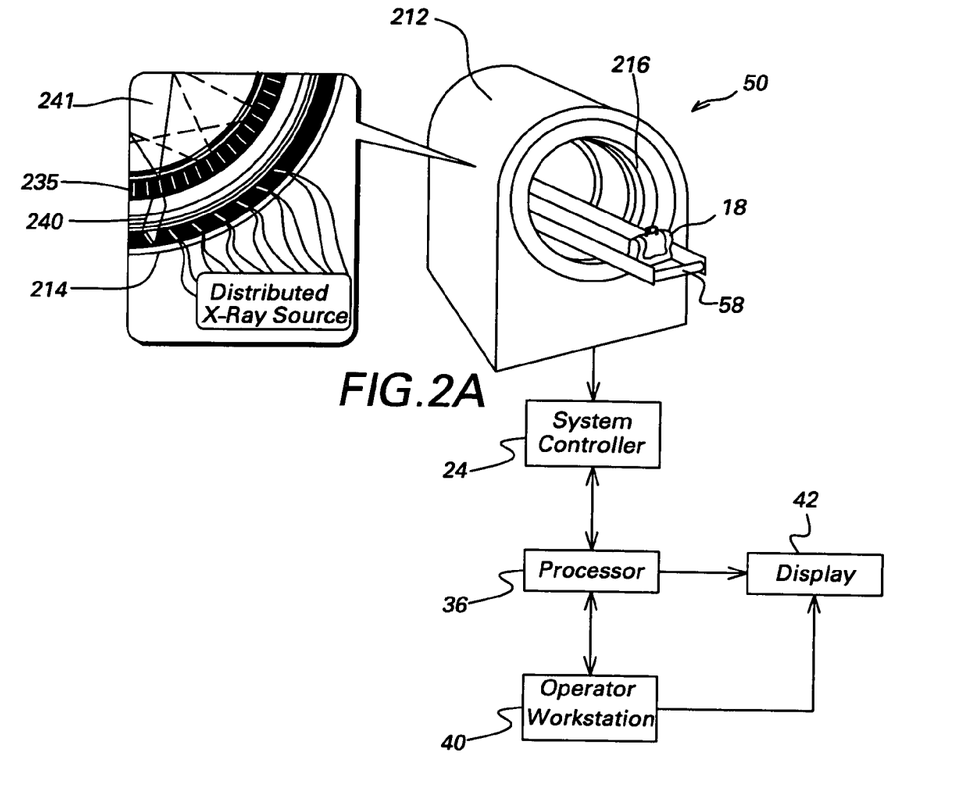
FIGS. 2A and 2B are diagrammatical views of another exemplary imaging system in the form of a CT imaging system for use in producing processed images and generating variance image data and maps in accordance with aspects of an exemplary embodiment.
Figure 2B:
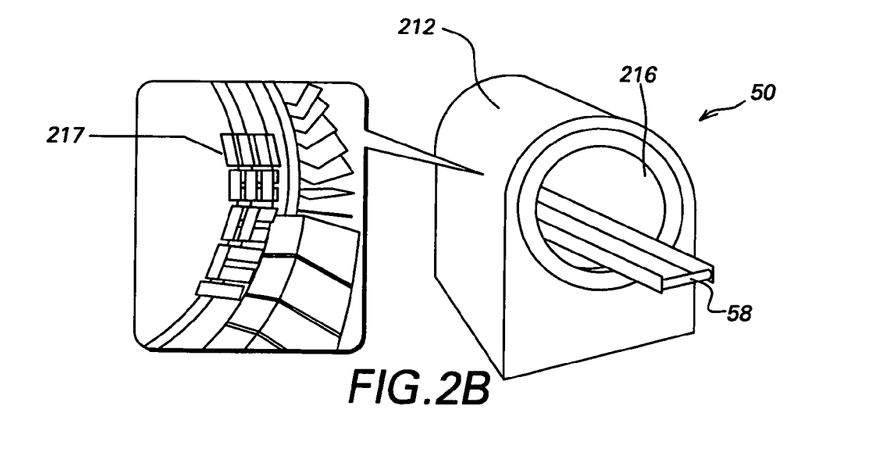

Referring generally to FIGS. 2A and 2B, another exemplary imaging system may include a CT scanning system 50 having no moving parts. The CT scanning system 50 includes a source ring 212 including a distributed x-ray source 214. The acquisition subsystem 50 also includes a detector ring 216 adjacent to the source ring 212. As illustrated, the detector ring 216 is offset from the source ring 212. It should be appreciated, however, that "adjacent to" should be interpreted in this context to mean the detector ring 216 is offset from, contiguous with, concentric with, coupled with, abutting, or otherwise in approximation with the source ring 212. The detector ring 216 includes a plurality of distributed detector modules 217 which may be in linear, multi-slice, or area detector arrangements. A conveyor belt 58 is illustrated positioned in the aperture between the source ring 212 and the detector ring 216. An exemplary embodiment of the detector module 217 includes a detector cell having a pitch of, for example, two millimeters by two millimeters, providing an isotropic resolution on the order of one cubic millimeter. Another exemplary embodiment of the detector module includes a detector cell having a pitch of one millimeter by one millimeter. Each of the x-ray sources 214 sends an electron beam 240 to a target ring 235, which in turn sends a fan-like beam of x-rays 241 toward the luggage 18 on the conveyor belt 58. The x-rays 241 travel through the luggage 18, are attenuated to some extent by the contents of the luggage 18, and impinge upon one or more discrete detector modules 217. A suitable detector module 217 may include a scintillation element or a direct conversion material.

The detector modules 217 form intensity measurement data from the x-rays 241. This data is collected from the detector modules 217 and then undergoes pre-processing and calibration to condition the data to represent the line integrals of the attenuation coefficients of the scanned objects. The processed data, commonly called projections or measured projection data, are then filtered and back-projected to formulate an image of the scanned area. The processor 36, mentioned above as typically used to control the entire CT system 10, may also control the CT system 50. The main processor that controls the operation of the system 50 may be adapted to control features enabled by the system controller 24. Further, the operator workstation 40 is coupled to the processor 36 as well as to the display 42, so that the reconstructed image may be viewed.

Alternatively, some or all of the processing described herein may be performed remotely by additional computing resources based upon raw or partially processed image data. In accordance with an exemplary embodiment, the processor is configured to generate reconstructed image data and variance image data using the technique as described in subsequent paragraphs.

While in the present discussion reference is made to a CT scanning system that scans in a generally circular geometry, other geometries, such as, for example, a linear geometry, may be envisioned as well. Once reconstructed, the image produced by the system of FIG. 1 or 2 reveals internal features of an enclosed container, such as the luggage 18. Further, the present technique could apply to three-dimensional or cone beam acquisitions as well as to two-dimensional acquisitions. In brief, it should be borne in mind that the systems of FIG. 1 or FIGS. 2A and 2B are described herein as exemplary systems only. Other system configurations and operational principles may, of course, be envisioned for acquiring and processing image data and variance data and for utilizing the data as discussed below.

Figure 3:
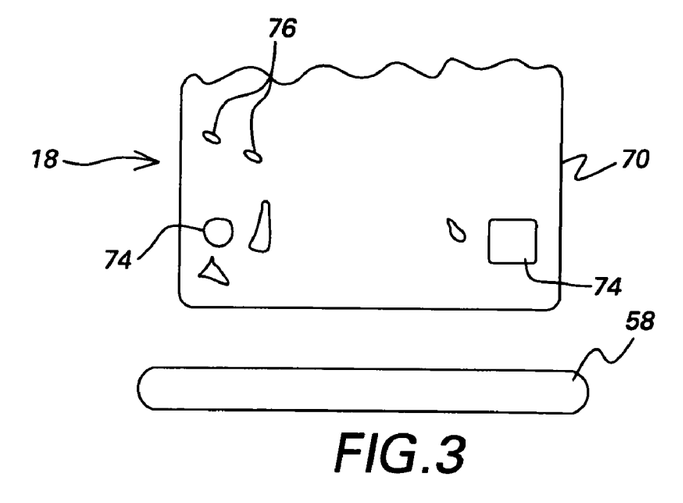
FIG. 3 is a cross-sectional view of an exemplary image of a region of a subject of interest, acquired via an imaging system of the type shown in FIG. 1.

FIG. 3 is a partial image 70 illustrating a reconstructed slice of a portion of the luggage 18, acquired via an imaging system 10, 50 of the type shown in FIG. 1 or 2A, 2B. The system 10 or 50 acquires image data, processes it and forwards it to the data processing circuitry 20 (FIG. 1) where additional processing and analysis of the image data are performed. The images are typically analyzed for the presence of anomalies or indications of one or more features of interest, such as, for example, the presence of suspect materials that may be contraband, such as an explosive material. It should be noted, however, that the present techniques are in no way limited to the contraband and/or explosive detection field or to any specific application.

Referring again to FIG. 3, reference numeral 74 represents internal features in the image 70 of the subject of interest 18. Reference numeral 76 represents a location of a high-attenuating object or a special object, such as a metal object in the article of luggage 18. As will be appreciated by those skilled in the art, the image 70 depicting the portion of the luggage 18 is for illustrative purposes only and is not meant to limit the imaging of other types of images by the imaging system 10.

As will be appreciated by those skilled in the art, projection data from X-ray based technologies such as CT are subject to random fluctuations in their measurements that generally result in noise such as photon (X-ray) noise, quantum noise or electronic noise. Noise in projection measurements causes randomness in the reconstructed CT image attenuation values or, equivalently, in the CT mean pixel values, resulting in variability in the mean pixel values. One way of measuring how this noise is propagated into the final reconstructed image is to measure the variance associated with each pixel. The present technique, as described more fully below, offers an efficient approach for processing measured data and for generating variance data from image projection measurement data, permitting the effective analysis of image features and objects, including high-attenuating objects 76 in reconstructed images, as well as other benefits.

Figure 4:
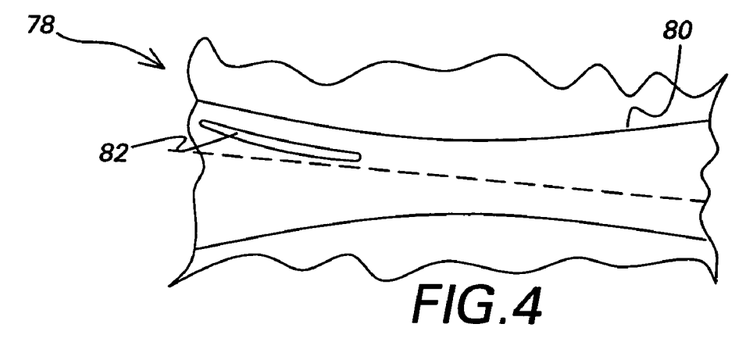
FIG. 4 is a diagrammatical representation of an exemplary variance map generated by the system of the type shown in FIG. 1.

FIG. 4 is a diagrammatical representation of a variance map 78 generated by the system 10 of the type shown in FIG. 1, based upon variance data computed as described below. The variance map 78 of FIG. 4 corresponds to the region shown in the partial image 70 of FIG. 3. Reference numeral 80 represents a region of relatively high variance in the variance map 78. Although variance is computed on a pixel-by-pixel basis, and all pixels may be expected to exhibit some variance, higher variance values, that may affect the reliability or utility of the image data may occur in particular regions, such as region 80, due to the presence of particular objects, such as the objects 76 shown in FIG. 3. Reference numeral 82 represents a region of still higher variance in the variance map 78 caused by the presence of high-attenuating objects 76 in the image 70 shown in FIG. 3. That is, reference numeral 82 indicates regions of uncertainty in the image 70 due to the presence of the high-attenuating objects 76. The variance map shown in FIG. 4 may be utilized to visualize the variance of regions of the image due, for example, to one or more features or high-attenuating objects 76 in the image 70, thereby providing useful analysis to a luggage or parcel screener as described in greater detail below.

Figure 5:
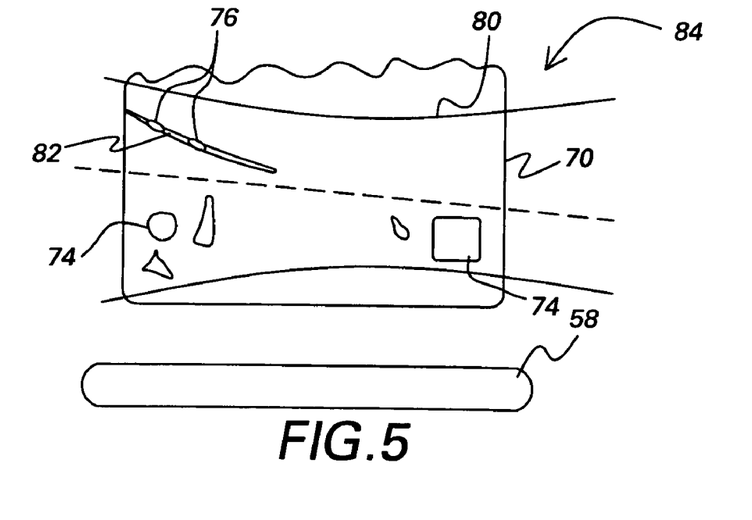
FIG. 5 is a diagrammatical representation of a digital composite image of the image shown in FIG. 3 and the variance map of FIG. 4.

FIG. 5 is a diagrammatical representation of a digital composite image 84 of the image 70 shown in FIG. 3 and the variance map of FIG. 4. As indicated in FIG. 5, the digital composite image 84 is an overlay of the variance map 78 of FIG. 4 and the slice image 70 of the portion of the luggage 18 of FIG. 3. The digital composite image 84 provides visual cues as to high noise regions in the reconstructed image. As indicated in FIG. 5, the high noise regions may be indicated by the presence of bright streaks at the intersection of the high-attenuating objects 76 and the region of higher variance 82.

As will be appreciated by those skilled in the art, the variance data computed as summarized below may be used and visualized in many ways. For example, the variance data may be mapped as shown in FIG. 4 to provide an indication of image data quality and reliability. Such visualizations may be entirely separate from displays of the corresponding reconstructed image. Alternatively, the map may be simply overlaid with the reconstructed image, or used to alter the image in any desired respect. For example, the relative values of the variance may be used to alter each pixel of the reconstructed image, such as by changing the intensity of a color, such as red, to reflect the relative variance of each pixel in the image. As summarized below, a user viewing the combined image is thereby alerted to the relative reliability of the image data in light of the variances of the pixel data.

Figure 6:
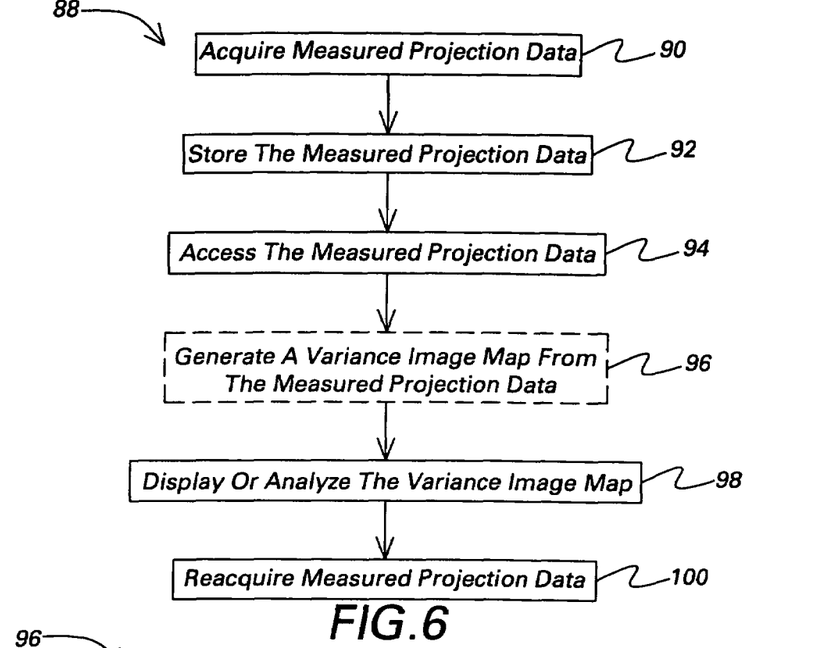
FIG. 6 is a flowchart describing exemplary steps for generating and displaying variance image data in accordance with an exemplary embodiment to permit display and analysis of the data and of images of the type shown in the previous figures.

FIG. 6 is a flowchart of logic 88 including exemplary steps for generating variance data and for displaying a variance map in accordance with embodiments of the present technique to permit display and analysis of the images of the type shown in FIGS. 3-5. In step 90, the measured projection data is acquired by the computed tomography system 10 or 50. In step 92, the measured projection data is stored. Referring to FIG. 1, the measured projection data may be stored in the memory 38, located at the data acquisition system 34 or stored at remote components. In step 94, the measured projection data is accessed for processing to identify variances in the pixel data. In an exemplary embodiment of the present technique, the processing comprises generating variance data, and where desired, a variance map from the measured projection data in step 96, as will be described in greater detail below. In step 98, the variance map may be displayed or analyzed for diagnostic purposes as will also be described in greater detail below.

It should be noted that processing of the measured and stored data may occur at the time of acquisition or subsequently, as in post-processing of the data. Thus, the processing may occur at the CT scanner, or completely remotely from the scanner and at some subsequent time. Moreover, certain of the functions and processes summarized in FIG. 6 and discussed below may be optional. Such optional processes may be performed, for example, only upon request or command of an operator.

As indicated at step 100, measured projection data may be reacquired based upon the variance data computed. Such reacquisition may be useful for adapting a subsequent acquisition sequence by altering the acquisition system settings based upon the variance map. For example, a subsequent acquisition may be in order at a higher flux intensity to permit an enhanced image to be reconstructed with greater analytical value. The present technique thus greatly facilitates the analysis process by permitting rapid analysis of the reliability of image data and reacquisition, where appropriate, obviating the need to schedule a second, subsequent imaging session.

Figure 7:
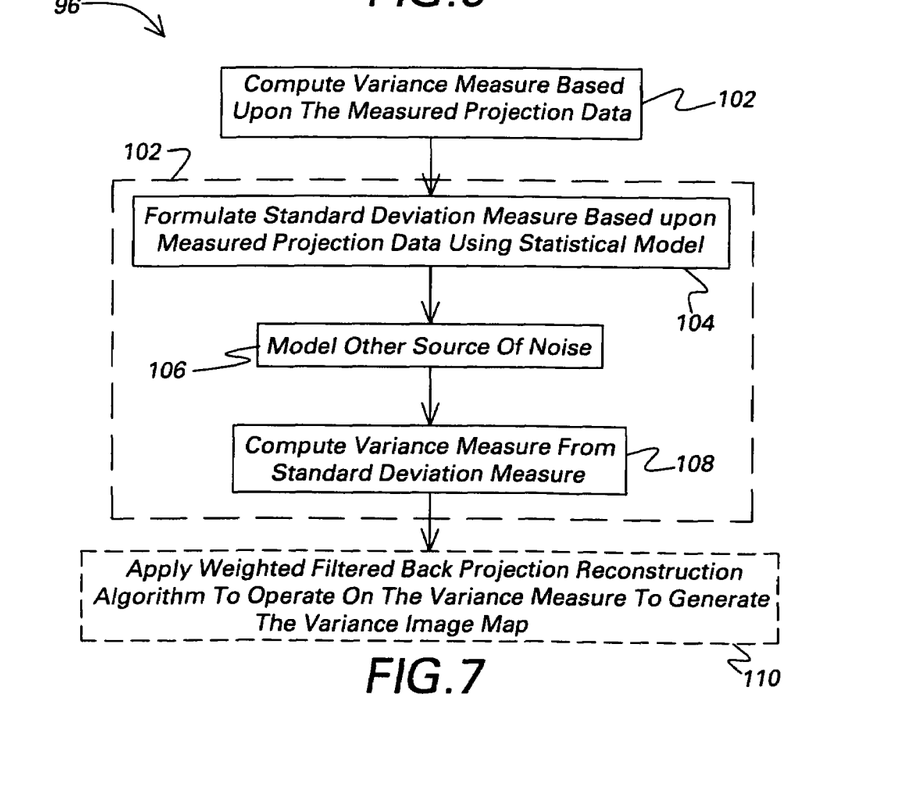
FIG. 7 is a flowchart describing in greater detail certain exemplary steps for implementing the process of FIG. 6.

FIG. 7 is a flowchart summarizing in greater detail exemplary processes that may be included in determining the variance data or variance measure summarized in step 96 of FIG. 6. In step 102, a variance measure is formulated based upon the measured projection data. In accordance with an exemplary embodiment, the variance measure is formulated or computed by replacing the measured projection data by an estimate of the signal variance. In the case of X-ray CT, the estimate of the signal variance is determined by assuming that the measured projection data are Poisson random variables. In the case of a high-count rate CT, the estimate of the signal variance is determined by assuming that the measured projection data is normally distributed with a standard deviation equal to the square root of the mean.

Steps 104, 106 and 108 describe in greater detail the formulation of the variance measure in accordance with one implementation of an exemplary embodiment. The numeral 102 is denoted to indicate that the Steps 104, 106 and 108 within the dotted-line box further detail the formulation of the variance measure. In step 104, a standard deviation measure is formulated based upon the measured projection data using a statistical model.

In an exemplary embodiment of the present technique, the statistical model for noise measurement is formulated as follows, wherein the $$\text{distribution of variance measures} = N\left(\bar{p}, \frac{1}{\sqrt{I_0}} e^{\bar{p}/2}\right) \quad (1)$$

and wherein p refers to the line integral of the X-ray attenuation coefficient corresponding to the measured projection data, N corresponds to normally distributed p-values, I refers to the intensity value of the measured projection data, $I_o$ refers to that intensity in air (i.e., when no object is present), and $\bar{p}$ refers to the mean value of p. As will be appreciated by those skilled in the art, because the value of p obtained is noisy and comes from a random process, $\bar{p}$ is not ideally available and the value of $\bar{p}$ is approximated to p in practice.

Referring to equation (1), the mean of p, that is, $\bar{p}$, is obtained by computing a ratio of the negative logarithm of the intensity of the measured projection data (I), to the intensity in air (Io), which may be expressed as follows:

$$p = \bar{p} = -\log(I/I_o) \quad (2)$$

and the standard deviation of p is expressed by the equation, $$SD(p) = \frac{1}{\sqrt{I_0}} e^{\bar{p}/2}. \quad (3)$$

In step 106, various other sources of noise or measures of uncertainty due to other physical effects may be modeled and calculated from the measured projection data. One such measure of uncertainty, for example, could be based upon the path length or integrated attenuation associated with the measured projection data. At step 108, the variance measure is computed from the standard deviation measure derived in equation (3). It should be borne in mind that the measured projection data that is input into the statistical model is, in one exemplary embodiment, offset corrected and normalized before taking the logarithmic value.

The above steps describe the process of formulating a statistical relationship and statistical model between the measured projection data and the estimate of the variance measure associated with the measured projection data, in accordance with a specific embodiment of the present technique. However, as will be appreciated by those skilled in the art, the particular relationship between the measured projection data and the estimate of the variance measure may be altered based upon one or more of the processing steps involved in handling the measured projection data prior to reconstructing the image. The variance measure may also take into account uncertainty in the projection data due to other sources of error, such as quantization error, electronic noise in the Data Acquisition System (DAS), or other such sources of error.

At step 110, a weighted filtered backprojection reconstruction algorithm is used to operate on the variance data to generate the variance map as will be described in greater detail below. In practice, other reconstruction algorithms may be employed for generating the variance map based upon the variance data.

Figure 8:
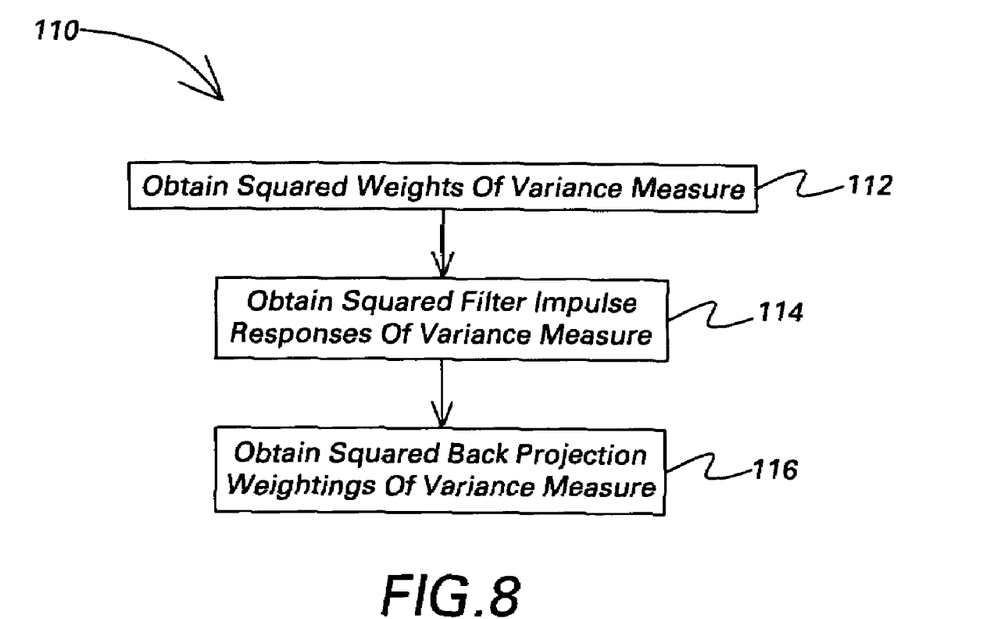
FIG. 8 is a flowchart describing in greater detail certain other exemplary steps that may be included in the process of FIG. 7.

FIG. 8 is a flowchart summarizing in somewhat greater detail, a manner in which the analytical reconstruction algorithm may be employed to generate the variance map as summarized at step 110 in the flowchart of FIG. 7. In accordance with one embodiment of present technique, the variance measure based upon the measured projection data obtained by a statistical model (e.g. as summarized in Equation 1) is processed by an analytical technique. In a presently contemplated embodiment, the technique includes a series of weighting, filtering and backprojection steps to generate the variance map, in a process known as weighted filtered backprojection (WFBP). In an exemplary embodiment, a weighted filtered backprojection algorithm is used to generate the variance map. However, as will be appreciated by those skilled in the art, an exemplary embodiment for generating a variance map may be applied to other analytical reconstruction algorithms.

A typical WFBP technique comprises the steps of weighting, filtering and backprojecting data for each projection measurement over the reconstruction volume. The weighting of the projection data is performed with a point-by-point multiplication by a (possibly pre-calculated) two-dimensional array. The filtering or convolution step filters the image data to decorrelate data points, and may be carried out as a series of one-dimensional convolutions. In the backprojection step, the projection measurements are added to all pixels in an image along the lines of the original projection paths, combined with a weighting for fan and cone beam geometries.

As summarized in FIG. 8, in accordance with one exemplary embodiment, the generation of the variance map using a WFBP algorithm includes the following steps. In step 112, the squared weights of the variance measures are obtained. That is, in the weighting step of the WFBP algorithm, each variance measure is weighted by a factor of w*w. In step 114, the squared filter responses of the variance measures are obtained. That is, the filter responses are squared, wherein each variance measure is convolved with the square of the sequence or impulse response, that is, h(n)*h(n) (where h(n) refers to the impulse response). In step 116, squared backprojection weightings of the variance measures are obtained. That is, each voxel variance measure is updated with the variance measure of the corresponding detector, weighted by a power of the distance from the voxel to the source for divergent (fan or cone) geometries. Thus, as a result of the steps 112, 114 and 116, a variance map comprising pixel variances is generated from the WFBP algorithm as described above.

Figure 9:
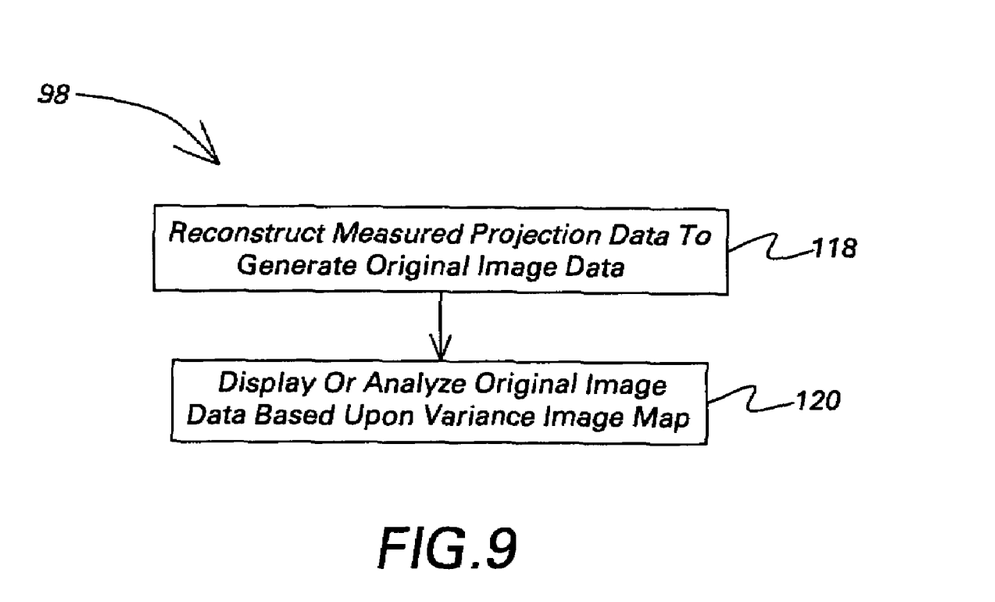
FIG. 9 is a flowchart describing in greater detail exemplary steps in which the variance image data may be employed.

FIG. 9 is a flowchart summarizing in somewhat greater detail exemplary steps for displaying or analyzing the variance image data or variance map summarized in step 98 of FIG. 6. In step 118, the measured projection data is reconstructed to generate original image data as shown in FIG. 3. In step 120, the variance map generated in step 96 is displayed or analyzed based upon the original image data as shown in FIG. 4 and FIG. 5. As described above, the variance map generated in accordance with an exemplary embodiment provides visual cues to the high noise regions in the reconstructed image. In addition, the variance map may be used to provide for improved accuracy in computer aided detection (CAD) and classification algorithms that utilize variance information. The information may, in fact, be used to adapt such CAD techniques for specific use of the variance data, such as by adjusting sensitivity, confidence, or other parameters employed by the algorithms. Moreover, the data provide visual cues to identify image features that may result from or that may be affected by structured noise as opposed to an object's structure. Where desired, the variance data may be used to calculate performance bounds on detection algorithms by propagating the variances into the decision-making process of the detection algorithm, as in a CAD algorithm discussed above. Similarly, the data may be used to compute confidence bounds on actual pixel values that reflect the variability caused by the measurement error noise, and compute confidence bounds on object size estimates wherein objects segmented out from reconstructed datasets may have measurement errors propagated into them from the pixel values. Further, based upon the variance analysis, the data may be used as a basis for recommending or even automatically performing reacquisition of image data from an acquisition system, such as to obtain new data that may exhibit less variance.

The following paragraphs describe in greater detail, a plurality of further applications that explain the use of variance data and variance maps formulated in accordance with an exemplary embodiment in a plurality of image processing, detection, quantification, measurement, and visualization applications.

The variance measure formulated in accordance with an exemplary embodiment may be utilized to perform interpolation on image data. Interpolation techniques include, for example, bi-linear, tri-linear, bi-cubic and tri-cubic interpolation. Existing interpolation techniques perform interpolation using a single scalar value, such as the mean CT value. In accordance with an exemplary embodiment, interpolation of both mean and variance data may be performed either in an independent fashion or simultaneously with existing interpolation techniques. Further, interpolation techniques utilizing variance data in accordance with an exemplary embodiment produce intermediate scalar values (in any number of dimensions) that weight data values based on confidence bounds or measures.

The variance data formulated in accordance with an exemplary embodiment may be utilized in image filters, such as for example, in noise reduction filters to adaptively smooth images. The image filters may be adapted to accept, use, and formulate variance data for each pixel in accordance with an exemplary embodiment by using a weighted average of neighboring pixel intensities, wherein the weighting of the pixels is based, for example, on the inverse square root of the variance at a neighboring pixel location.

Moreover, the variance measure formulated in accordance with an exemplary embodiment may be utilized in edge detection techniques. Edge detectors, such as, for example Canny edge detectors may use variance data to determine confidence measures for second derivative zero values comprising edge events. In addition, knowledge of the local variance or variance measure enables the computation of the signal-to-noise ratio (SNR) of image data used to estimate the accuracy of the location of detected edges. As will be appreciated by those skilled in the art, edge detection techniques rely on threshold values to determine start and stop points for connecting local edge components. Knowledge of variance data may then be used to determine optimal threshold values.

The variance measure formulated in accordance with an exemplary embodiment also may be utilized in object segmentation techniques and object sizing techniques to determine confidence bounds or measures on object sizes. Object sizing techniques include, for example, thresholding and gradient-based methods, such as watershed techniques and edge detector techniques. In accordance with an exemplary embodiment, an object may be characterized, for example, via a threshold value at a median density value with a standard deviation value of +/−1 resulting in the creation of a plurality of iso-surfaces indicating surface location with confidence bounds. The information thus obtained may be used to size objects to fit regions of interest. In addition, the variance measure formulated in accordance with an exemplary embodiment may be utilized to modulate gradient-based deformable models for segmentation. More specifically, variance data may be used to provide an uncertainty estimate for the gradient at each location, which may be used to accelerate or slow-down the growth of the deformable models.

Variance data formulated in accordance with an exemplary embodiment may be further utilized to provide confidence bounds or measures for segmentation techniques that employ region growing (or shrinking) techniques. Existing region growing (and shrinking) techniques typically add pixels to (or subtract pixels from) a region based solely on intensity values. A decision to add a pixel to a region may be augmented by variance information. Similarly, variance data may be applied in region merging techniques, wherein a decision to merge two or more regions may be augmented using variance information.

Furthermore, the availability of variance data or measures enables greater accuracy in segmentation techniques and material classification, and provides for improved model fitting. Variance data may be used to define the probability distributions on image intensity profiles under competing hypotheses with greater accuracy. Object models typically model the presentation of objects in a noise-free device. A variance map generated in accordance with an exemplary embodiment may be incorporated in a conditional probability distribution on data from an imaging device given the noise-free image. In addition, variance data may be propagated to calculate confidence bounds or measures on the probability of a model, wherein variance information may be used to fit models to data described by the models. Variance information may additionally be used to compute confidence bounds or measures for various materials.

Variance data formulated in accordance with an exemplary embodiment may also be utilized in multi-dimensional display and visualization techniques. For example, iso-contours may display the surface +/−N standard deviation values in addition to the mean contour value. Similarly, surfaces may display additional standard deviation surfaces, facilitated by transparency. Volume-rendering techniques may make use of variance data to provide the mean and +/−N standard deviation colors/opacities that are accumulated during volume rendering.

Variance data formulated in accordance with an exemplary embodiment may be further utilized in low flux imaging techniques wherein variance maps are used to design conformal shaped filters to control the photon flux and the hardness of the spectrum to deposit photons only where specifically needed. Further, flux may be based on image region quality, wherein low flux is provided to image quality regions of low interest. In addition, flux optimization and flux control may be applied prior to scanning (for example, using scout imaging information, prior CT scans, protocol optimization, CT scanner design) or during a scan (for example, using real time scanning information).

The embodiments illustrated and described above thus provide a technique for the efficient generation of variance data and variance maps to provide additional information about measured projection data and reconstructed images useful for analysis and threat evaluation for luggage and parcels. In addition, the technique for generating the variance map is computationally efficient because changing the weighting factors and squaring the filter impulse response steps using the weighted filtered backprojection reconstruction algorithm in accordance with an exemplary embodiment may be performed offline, resulting in no change in the computational cost of the process of generating the variance map. Also, the variance measure may be computed in the same number of operations it takes to compute the mean pixel value. That is, the generation of the variance map in accordance with an exemplary embodiment does not require any additional measurements to determine the variance measure. Furthermore, the present technique may be applied to CT reconstruction algorithms from any geometry, such as for example, 2D, 3D, 4D, axial, helical, cone beam, and so forth.

As will be appreciated by those skilled in the art, the embodiments and applications illustrated and described above will typically include or be performed by appropriate executable code in a programmed computer. Such programming will comprise a listing of executable instructions for implementing logical functions. The listing can be embodied in any computer-readable medium for use by or in connection with a computer-based system that can retrieve, process and execute the instructions. Alternatively, some or all of the processing may be performed remotely by additional computing resources based upon raw or partially processed image data.

In accordance with an exemplary embodiment, the computer-readable medium is any means that can contain, store, communicate, propagate, transmit or transport the instructions. The computer readable medium may be an electronic, magnetic, optical, electromagnetic, or infrared system, apparatus, or device. An illustrative, but non-exhaustive list of computer-readable mediums may include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

Figure 10:
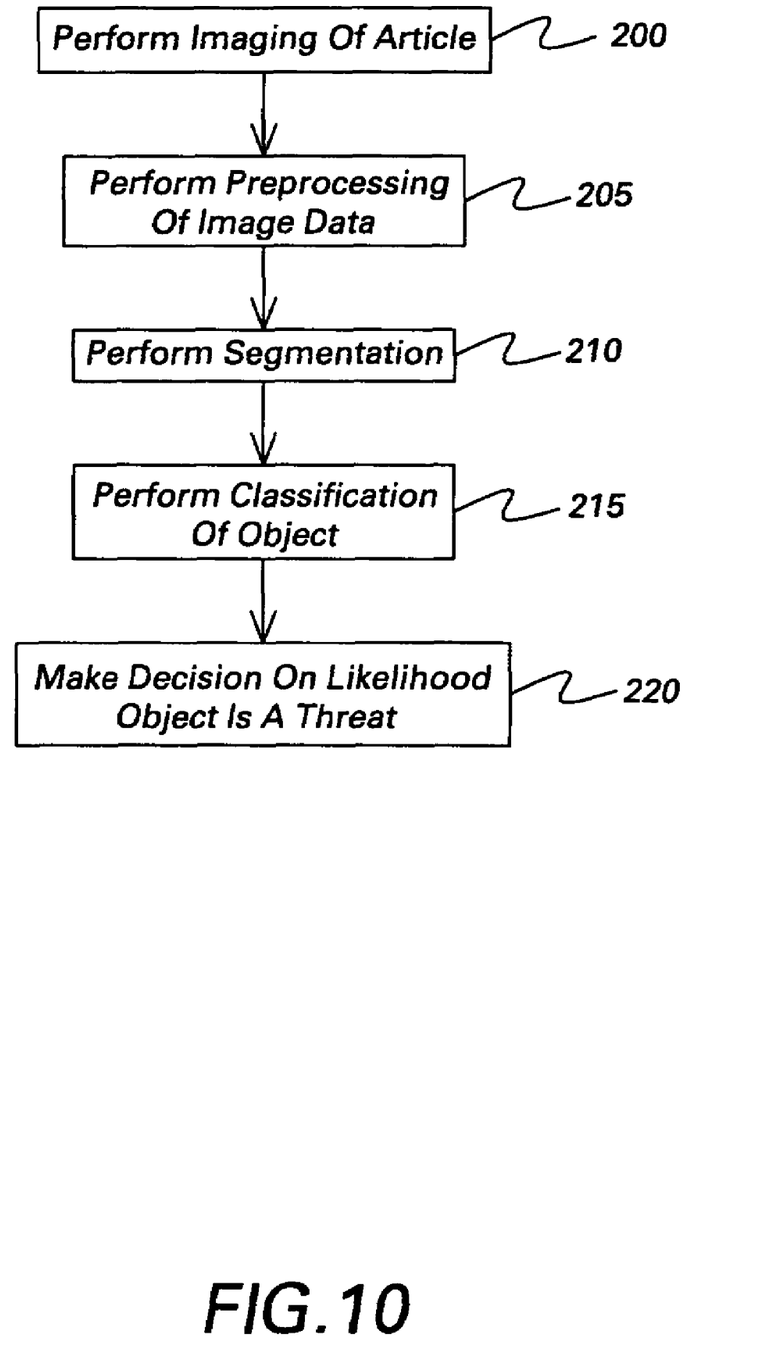
FIG. 10 illustrates a process for detecting and identifying contraband within an enclosed container in accordance with an embodiment of the invention.

Referring now to FIG. 10, next will be described a method for determining whether a contraband item, such as, for example, an explosive, is within an enclosed container. At Step 200, and as described previously, the image of the luggage 18 is obtained through the imaging system 10 or 50. At Step 205, preprocessing of the image data is performed. Specifically, for each pixel, or voxel, of data, a mean value x of density and a variance value $\sigma$ is obtained. Thus, at each voxel, an intensity level as well as a standard deviation from that level is known. Alternately, the variance value $\sigma^2$ can be calculated.

Connected components algorithms are known for use in segmentation. Such an algorithm groups voxels together that have common properties into discrete objects. The criteria used by the connected components algorithm for deciding whether specific voxels belong to the same object are various. For instance, CT intensity values may be used.

At Step 210, a segmentation process is performed. One exemplary embodiment of the invention utilizes a vector connected components (VCC) algorithm for segmentation. The VCC algorithm utilizes not just intensity values but also uses the direction of the local normal vector as a criterion for segmenting voxels. In the presence of structured noise, object segmentation that relies on hard thresholds may fail when the noise causes a shift in CT intensity values or in the local normal vector values. Segmentation failures may manifest as missing regions of the segmentation, including holes and missing edges. In extreme cases, structured noise may incorrectly separate the segmented object into two or more separate objects. Variance map information can allow the thresholds to be relaxed where structured noise is present, resulting in a segmentation that is more faithful to the actual, physical object.

Further, the segmentation step may include partial volume deconvolution. Certain imaged objects, such as sheet-like materials, are homogeneous, and partial volumes of voxels are obtained at the edge of the material. Partial volume effects can corrupt both mass and density estimates. Known imaging systems acquire images of objects and round off the edges, due primarily to a low pass filter. A point spread function controls how much rounding off occurs.

By knowing why noise occurs, it is possible to more accurately estimate the true edge of the object. Specifically, the true edge of the object can be estimated if the point spread function is known along with the location of the noise. Thus, the effects of partial volume can be corrected if the intensity profile in the direction normal to the object, for example, a sheet-like material, can be adequately sampled. The variance data, together with knowledge of the system point spread function, can be used to estimate the location of the edge of the sheet-like material to a sub-voxel accuracy. This allows objects such as sheet-like materials to be tracked in a statistically robust manner, and better density and mass estimates are possible.

After segmentation, at Step 215 classification of the object is performed to ascertain whether the object should be declared benign or threatening. Classification may be performed after the preprocessing and segmentation Steps 205, 210. For each of the Steps 205, 210 and 215, both the mean value of density and the standard deviation for each voxel is determined and propagated to obtain a confidence of the classification decision.

Some contraband may be shielded, namely placed within a heavy metal container, such as a pipe. The metal causes high noise in the voxels inside the pipe, and thus it is hard to use a CT to determine what is inside the pipe. However, an exemplary embodiment of the invention utilizes variance data to detect the presence of a shielded region and to conclude that the luggage 18 needs further examination.

Current federal guidelines governing the transportation industry require an operator interface allowing an operator to review images on a screen. The screen shows generally black and white images, with areas of high intensity being colored in red. Another exemplary embodiment includes providing colored imaged areas corresponding to areas having high variance data.

Finally, at Step 220, a decision is made on the likelihood the object within the luggage 18 is a threat. This decision may be accomplished based upon the intensity and variance data alone, or may be accomplished through visual inspection of an image display by an operator.

One issue related to scanning enclosed containers, such as luggage 18, is the trade off between speed of scanning and accuracy of determination. The need for a high throughput of bags, estimated to be about 1000 bags/hour or more, places demands on the amount of time available to perform image reconstruction and computer aided detection (CAD). One exemplary embodiment involves performing a crude reconstruction and a crude detection, neither of which take much time. Using the variance information gleaned through the detection, a statistical significance of the detection can be obtained. Based upon the statistical significance, or insignificance as the case may be, a decision can be made to iterate the acquisition, the reconstruction, the CAD, or all three at higher quality if deemed necessary.

Another issue encountered in imaging involves artifacts. Some images contain aliasing artifacts caused by the presence of high-attenuating (typically metallic) objects. These images will exhibit areas of high variance associated with the high-attenuation objects that cause these artifacts. While artifact reduction techniques are known for reducing artifact levels, they are computationally expensive. One exemplary embodiment uses variance data and the CT image to apply artifact reduction techniques only where they are needed, that is, only in places both where artifacts exist and a possible threat also is present.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed as new and desired to be protected by Letters Patent of the United States is:

1. A method for detecting contraband in an enclosed container with an imaging system, comprising:
   forming image data of the contents of the enclosed container;
   obtaining a mean density value and a voxel variance of noise inherent in the imaging system for each voxel of the image data;
   segmenting the voxels into discrete objects; and
   determining whether any of the discrete objects is contraband.

2. The method of claim 1, wherein the forming step comprises:
   acquiring projection data of the contents of the enclosed container; and
   processing the projection data to form the image data.

3. The method of claim 2, wherein said acquiring step comprises acquiring the projection data with a computed tomography machine.

4. The method of claim 1, wherein the segmenting step comprises utilizing intensity values and the direction of the local normal vector for each voxel as criteria for segmenting voxels into the discrete objects.

5. The method of claim 1, wherein the segmenting step comprises using a vector connected components algorithm.

6. The method of claim 1, wherein the segmenting step comprises a partial volume deconvolution for estimating the boundaries of the discrete objects to a sub-voxel accuracy.

7. The method of claim 6, wherein the partial volume deconvolution utilizes variance data and knowledge of a system point spread function to affect voxels having only a partial volume.

8. The method of claim 1, further comprising classifying the discrete objects.

9. The method of claim 8, wherein the mean density value and the voxel variance of noise inherent in the imaging system for each voxel of the image data is propagated through the obtaining and segmenting steps to obtain a confidence of the decision reached in the classifying step.

10. The method of claim 1, wherein the determining step determines whether any of the discrete objects comprises an explosive.

11. The method of claim 1, further comprising displaying images based upon the image data on a display screen.

12. The method of claim 11, wherein the displayed images are color-coded to highlight areas having high variance data.

13. A method for detecting contraband in an enclosed container, comprising:
  forming image data of the contents of the enclosed container by acquiring projection data of the contents of the enclosed container and processing the projection data to form the image data;
  obtaining a mean density value and a variation value for each voxel of the image data;
  segmenting the voxels into discrete objects, wherein the segmenting step comprises utilizing intensity values and the direction of the local normal vector for each voxel as criteria for segmenting voxels into the discrete objects; and
  determining whether any of the discrete objects is contraband.

14. The method of claim 13, wherein the acquiring projection data step is accomplished with a computed tomography machine.

15. The method of claim 13, wherein the segmenting step comprises using a vector connected components algorithm.

16. The method of claim 13, wherein the segmenting step comprises a partial volume deconvolution for estimating the boundaries of the discrete objects to a sub-voxel accuracy.

17. The method of claim 16, wherein the partial volume deconvolution utilizes variance data and knowledge of a system point spread function to affect voxels having only a partial volume.

18. The method of claim 13, further comprising classifying the discrete objects.

19. The method of claim 18, wherein the mean density value and the variation value for each voxel of the image data is propagated through the obtaining and segmenting steps to obtain a confidence of the decision reached in the classifying step.

20. The method of claim 13, wherein the determining step determines whether any of the discrete objects comprises an explosive.

21. The method of claim 13, further comprising displaying images based upon the image data on a display screen.

22. The method of claim 21, wherein the displayed images are color-coded to highlight areas having high variance data.

23. A system for detecting contraband, comprising:
  an imaging system for acquiring image data; and
  a processor configured to:
    obtain a mean density value and a voxel variance of noise inherent in the imaging system for each voxel of the image data; and
    segment the voxels into discrete objects.

24. The system of claim 23, wherein the imaging system acquires projection data of the contents of the enclosed container and processes the projection data to form the image data.

25. The system of claim 24, wherein the imaging system comprises a computed tomography machine.

26. The system of claim 23, wherein the processor is configured to utilize intensity values and the direction of the local normal vector for each voxel as criteria for segmenting voxels into the discrete objects.

27. The system of claim 26, wherein the processor comprises a vector connected components algorithm.

28. The system of claim 23, wherein the processor is configured to perform partial volume deconvolution for estimating the boundaries of the discrete objects to a sub-voxel accuracy.

29. The system of claim 28, wherein the processor utilizes variance data and knowledge of a system point spread function to affect voxels having only a partial volume.

* * * * *